J. C. SPOONER.
Improvement in Harness.

No. 120,118.

Patented Oct. 17, 1871.

Witnesses:
John Becker
Francis McArdle

Inventor:
J. C. Spooner
PER
Attorneys.

UNITED STATES PATENT OFFICE.

JONAS C. SPOONER, OF HOULTON, MAINE.

IMPROVEMENT IN HARNESS.

Specification forming part of Letters Patent No. 120,118, dated October 17, 1871.

*To all whom it may concern:*

Be it known that I, JONAS C. SPOONER, of Houlton, in the county of Aroostook and State of Maine, have invented a new and useful Improvement in Breast-Yoke Attachment for Harness; and I do hereby declare that the following is a full, clear, and exact description thereof, which will enable others skilled in the art to make and use the same, reference being had to the accompanying drawing forming part of this specification.

Figure 1:
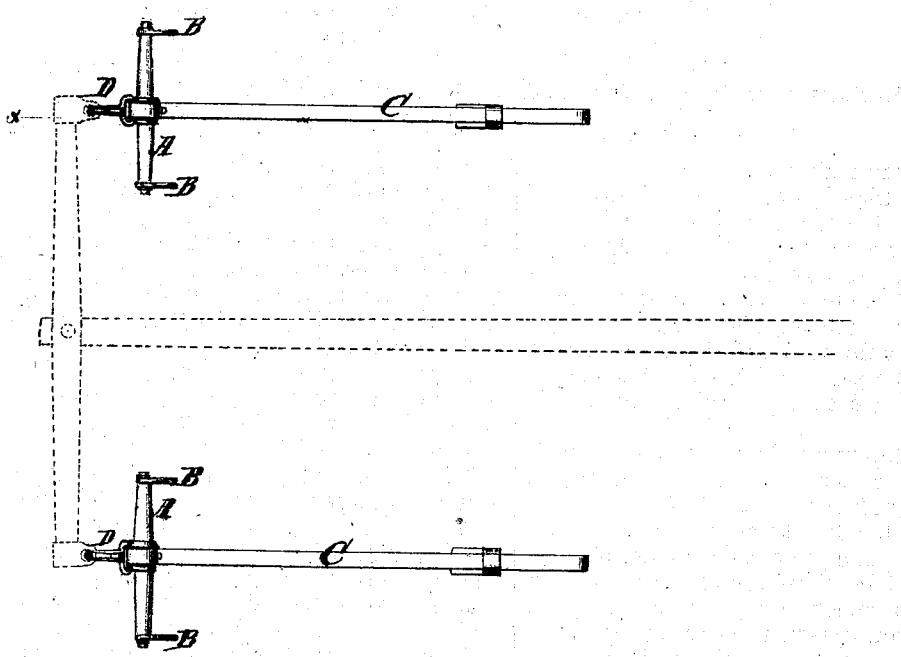
Figure 2:
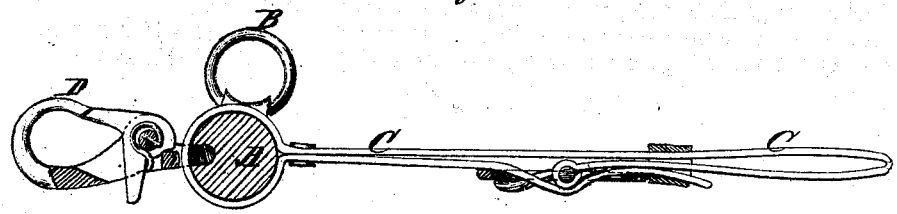

Figure 1 is a top view of my improved breast-yoke. Fig. 2 is a detail sectional view of the same taken through the line *x x*, Fig. 1.

My invention has for its object to furnish an improved breast-yoke attachment for double harness, which shall be simple in construction and satisfactory and effective in use, holding the tongue steady while passing over rough ground; and it consists in the construction and combination of the various parts of the devices, as hereinafter more fully described.

A is the breast-yoke, to the ends of which are attached rings B, to receive the straps that connect it with the hames or breast-collar of the harness. C is the martingale, which is passed around and secured to the middle of the breast-yoke A. To the middle of the breast-yoke A is also attached a snap-ring or hook, D, which is sprung into the ring attached to the end of the neck or pole-yoke; or, if desired, the snap-hook D may be attached to the end of the pole-yoke and snapped into a ring attached to the breast-yoke.

By this device the tongue will be held steady, even when passing over rough ground, and it will give the horses much better control over the carriage than when they are connected with the tongue in the ordinary manner.

This device may be used with equal facility and advantage with every kind of double harness.

Having thus described my invention, I claim as new and desire to secure by Letters Patent—

The breast-yoke A, having the martingale C attached to its middle part, and provided at its ends with rings B, and at its center with the snap-hook D, substantially as herein shown and described, and for the purposes set forth.

J. C. SPOONER.

Witnesses:
PELEG H. RENY,
B. W. KINNEY.

(72)